United States Patent
Okumura et al.

[11] Patent Number: 5,837,389
[45] Date of Patent: Nov. 17, 1998

[54] METAL THIN FILM MAGNETIC RECORDING MEDIUM HAVING A CR TA CU UNDERLAYER AND A COPT MAGNETIC LAYER

[75] Inventors: Yoshinobu Okumura, Takarazuka; Tadashi Akita, Ibaraki, both of Japan

[73] Assignee: StorMedia Incorporated, Santa Clara, Calif.

[21] Appl. No.: 847,467

[22] Filed: Apr. 25, 1997

[51] Int. Cl.$^6$ ..................................................... G11B 05/66
[52] U.S. Cl. .................. 428/667; 428/65.7; 428/694 TS; 428/900; 428/928
[58] Field of Search ............................... 428/694 TS, 667, 428/900, 928, 65.7

[56] References Cited

U.S. PATENT DOCUMENTS 5,006,388  4/1991  Kuzuo et al. ............................. 428/64

FOREIGN PATENT DOCUMENTS 9147341  6/1997  Japan .

*Primary Examiner*—Stevan A. Resan
*Attorney, Agent, or Firm*—Armstrong, Westerman, Hattori, McLeland & Naughton

[57] ABSTRACT

A magnetic recording medium has a magnetic layer of a Co alloy with a Pt content of about 3 to about 6 atomic % and is given a higher coercive force. The medium includes a ground layer formed on a nonmagnetic base plate and having a composition comprising, as expressed in atomic %, 1 to 6% of Ta, 1 to 6% of Cu and the balance substantially Cr, whereby an increased crystal lattice constant is afforded to the Cr.

1 Claim, 1 Drawing Sheet

METAL THIN FILM MAGNETIC RECORDING MEDIUM HAVING A CR TA CU UNDERLAYER AND A COPT MAGNETIC LAYER

FIELD OF THE INVENTION

The present invention relates to metal thin film magnetic recording media for use as magnetic disk devices such as hard disk driving devices.

BACKGROUND OF THE INVENTION

As shown in FIG. 1, metal thin film magnetic recording media for use as hard disk driving devices generally comprise a medium base plate having an amorphous NiP layer formed on a nonmagnetic substrate of Al alloy, glass or the like, and superposed layers successively formed over the base plate, i.e., a ground layer made of Cr or consisting primarily of Cr, a magnetic layer of Co alloy and protective film.

With improvements in recording density (track recording density and track density) in recent years, metal thin film magnetic recording media are required to have a higher record resolution. It is therefore required that magnetic recording media be improved in coercive force.

To meet this requirement, Pt is incorporated in an amount of about 10 atomic % into the Co alloy for forming the magnetic layer to give an improved coercive force to the layer. However, the presence of as much as about 10 atomic % of Pt requires a very expensive target for forming the layer by sputtering to result in an economical disadvantage, further entailing the drawback of increased medium noise, whereas a lower Pt content fails to afford an effectively improved coercive force.

An object of the present invention is to provide a magnetic recording medium wherein the Co alloy forming the magnetic layer has a reduced Pt content and which is nevertheless given a high coercive force.

SUMMARY OF THE INVENTION

The present invention provides a metal thin film recording medium comprising a ground layer, a magnetic layer of Pt-containing Co alloy and a protective film successively formed in superposed layers over a nonmagnetic medium base plate, the magnetic recording medium being characterized in that the ground layer has a composition comprising, as expressed in atomic %, 1 to 6% of Ta, 1 to 6% of Cu and the balance substantially Cr.

DETAILED DESCRIPTION OF THE INVENTION

Figure 1:
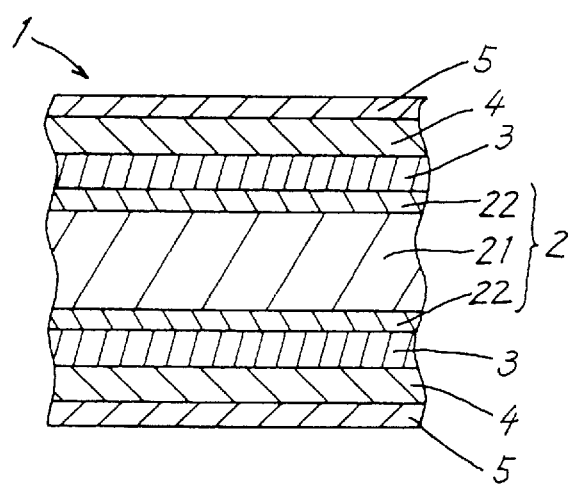
FIG. 1 is a fragmentary view in section of a metal thin film magnetic recording medium.

With reference to FIG. 1, the metal thin film magnetic recording medium 1 of the invention comprises a medium base plate 2 composed of a substrate 21 of Al alloy or glass and an NiP layer 22 formed on the substrate, and a ground layer 3, a magnetic layer 4 and a protective film 5 which are formed successively in this order in superposed layers over the base plate 2. The ground layer 3, magnetic layer 4 and protective film 5 are formed over each surface of the base plate 2 symmetrically with respect to the plate 2 in FIG. 1 to provide opposite medium surfaces usable for writing/reading, whereas the layers can be formed on only one plate surface to provide a medium adapted for writing/reading on only one surface.

The ground layer has a composition comprising, as expressed in atomic %, 1 to 6% of Ta, 1 to 6% of Cu and the balance substantially Cr. The magnetic layer is prepared from a Pt-containing Co alloy. Given below are the reasons for limiting the components of these layers.

Ta forms a solid solution with Cr, acting to increase the crystal lattice constant of Cr. The Ta content is limited to the range of 1 to 6% because if the content is lower than 1%, a sufficient effect to increase the lattice constant is not available, and because presence of more than 6% of Ta, on the other hand, is likely to make Cr amorphous to result in a lower coercive force.

Cu acts to produce finer crystal grains and to promote the effect of Ta to increase the lattice constant by segregating at the grain boundaries. The Cu content is limited to the range of 1 to 6% because the metal fails to fully produce these effects if the content is less than 1%, and because presence of more than 6% of Cu is liable to impair the crystal orienting effect of Cr on the magnetic layer.

The Pt-containing Co alloy for forming the magnetic layer can be, for example, of a composition comprising, as expressed in atomic %, 8 to 16% of Cr, over 3% to less than 7% of Ta, 3 to 6% of Pt and the balance substantially Co. Cr has an effect to give an improved coercive force through segregation. Ta promotes the improvement of coercive force by assisting in the segregation of Cr. Pt affords increased magnetic anisotropy and is effective for giving an improved coercive force.

When required, up to 10% of Ni and up to 4% of B can be incorporated into the Co alloy. Ni is useful for improving the coercive force and squareness ratio, while B acts to promote the effect of Pt to give a higher coercive force.

The Pt-containing Co forming the magnetic layer epitaxially grows on the particulate Cr alloy of the ground layer. It is thought that the ground layer having the foregoing composition affords satisfactory compatibility with the crystal lattice resulting from the epitaxial growth to give an improved coercive force.

The NiP layer 22, ground layer 3, magnetic layer 4 and protective layer 5 can be formed by DC sputtering, plating or other vacuum deposition process as already known.

DESCRIPTION OF THE PREFERRED EMBODIMENT

Magnetic recording medium specimens were prepared using medium base plates (3.5 inches in outside diameter and 31.5 mils in thickness) each comprising an Al substrate and an NiP layer formed thereon, by heating the base plate at a temperature of about 250° C. and forming a ground layer, magnetic layer and protective film over the NiP layer by a DC sputtering apparatus.

Table 1 shows the composition of the ground layer and that of the magnetic layer. The ground layer was about 600 Å (angstroms) in thickness, the magnetic layer had a thickness of about 400 Å, and the protective film was made substantially of C and had a thickness of about 120 Å. The bias voltage for forming the ground layer and the magnetic layer was about −200 V.

Table 1 also shows the lattice constant of the ground layer of each specimen and the coercive force measurement of the specimen.

TABLE 1

| Specimen No. | Ground layer (at. %) | | | Magnetic layer (at. %) | | | | | | Ground layer lattice constant (Å) | Coercive force (Oe) |
|---|---|---|---|---|---|---|---|---|---|---|---|
| | Ta | Cu | Cr | Cr | Ta | Pt | Ni | B | Co | | |
| 1 | — | — | 100 | 10 | 5 | 4 | — | — | 81 | 2.884 | 2000 |
| 2 | 2 | — | 98 | 10 | 5 | 4 | — | — | 81 | 2.892 | 2150 |
| 3 | 4 | — | 96 | 10 | 5 | 4 | — | — | 81 | 2.887 | 2050 |
| 4 | — | 4 | 96 | 10 | 5 | 4 | — | — | 81 | 2.890 | 2180 |
| 5 | 2 | 4 | 94 | 10 | 5 | 4 | 5 | 4 | 72 | 2.895 | 2430 |
| 6 | 4 | 4 | 92 | 10 | 5 | 4 | — | — | 81 | 2.896 | 2380 |

With reference to Table 1, Specimen No. 1 is a comparative example wherein the ground layer is made substantially of Cr, Specimens No. 2 and No. 3 are comparative examples wherein the ground layer contains Ta, Specimen No. 4 is a comparative example wherein the ground layer contains Cu, and Specimens No. 5 and No. 6 are examples of the invention wherein the ground layer contains both elements Ta and Cu.

The results given in Table 1 show that the use of a Cr-base alloy containing specified amounts of the two elements Ta and Cu for the ground layer gives an increased crystal lattice constant to the ground layer, affording a higher coercive force to the magnetic recording medium.

As described above, the magnetic recording medium of the present invention can be given a high coercive force even when the Co alloy forming the magnetic layer has a low Pt content of about 3 to about 6 atomic %. This reduces the cost of the target to be used for sputtering and provides a high record resolution for the recording medium which must be adapted for an improved recording density.

Apparently, the present invention can be modified or altered by one skilled in the art without departing from the spirit of the invention. Such modifications or alterations are included within the scope of the invention as set forth in the appended claims.

What is claimed is:

1. A metal thin film recording medium comprising a ground layer, a magnetic layer of Pt-containing Co alloy and a protective film successively formed in superposed layers over a nonmagnetic medium base plate, the magnetic recording medium being characterized in that the ground layer has a composition comprising, as expressed in atomic %, 1 to 6% of Ta, 1 to 6% of Cu and the balance substantially Cr.

* * * * *